United States Patent
Kim et al.

(10) Patent No.: US 12,338,565 B2
(45) Date of Patent: Jun. 24, 2025

(54) ELECTRONIC DEVICE AND CONTROLLING METHOD THEREOF

(71) Applicant: Samsung Electronics Co., Ltd., Suwon-si (KR)

(72) Inventors: Kyungjae Kim, Suwon-si (KR); Jooyoo Kim, Suwon-si (KR); Hyungseon Song, Suwon-si (KR); Sukbae Kim, Suwon-si (KR); Judai Kim, Suwon-si (KR); Dukkyun Na, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 769 days.

(21) Appl. No.: 17/420,521

(22) PCT Filed: Nov. 20, 2020

(86) PCT No.: PCT/KR2020/016517
§ 371 (c)(1),
(2) Date: Jul. 2, 2021

(87) PCT Pub. No.: WO2021/145551
PCT Pub. Date: Jul. 22, 2021

(65) Prior Publication Data
US 2022/0341078 A1    Oct. 27, 2022

(30) Foreign Application Priority Data
Jan. 15, 2020 (KR) .......... 10-2020-0005592

(51) Int. Cl.
*D06F 34/04* (2020.01)
*D06F 34/14* (2020.01)
(Continued)

(52) U.S. Cl.
CPC .......... *D06F 34/04* (2020.02); *D06F 34/14* (2020.02); *G06F 18/23213* (2023.01); *G06N 20/00* (2019.01)

(58) Field of Classification Search
CPC .......... D06F 34/04; D06F 34/14; D06F 31/00; D06F 2103/02; D06F 2103/16;
(Continued)

(56) References Cited

U.S. PATENT DOCUMENTS 6,742,209 B2 * 6/2004 Jeon ............ D06F 34/05
68/12.01
8,463,640 B2    6/2013 Jang et al.
(Continued)

FOREIGN PATENT DOCUMENTS

AU    2018257685 B2 * 7/2021 .......... D06F 33/00
JP    2016-017917 A    2/2016
(Continued)

OTHER PUBLICATIONS

Milasi, Rasoul Mohammadi, Mohammad Reza Jamali, and Caro Lucas. "Intelligent washing machine: A bioinspired and multi-objective approach." International Journal of Control, Automation, and Systems 5.4 (2007): 436-443. (Year: 2007).*
(Continued)

*Primary Examiner* — Randall K. Baldwin
(74) *Attorney, Agent, or Firm* — Jefferson IP Law, LLP

(57) ABSTRACT

Disclosed is an electronic device. The electronic device includes a memory storing information on a trained artificial intelligence model, a communication interface, and a processor configured to obtain recommended process information by using the artificial intelligence model and control the communication interface to transmit the obtained recommended process information to a washing related machine, and the processor is configured to, based on usage informa-
(Continued)

tion of each of a plurality of washing related machines, group the plurality of washing related machines into a plurality of groups and obtain tendency information of a group to which the washing related machine belongs among the plurality of groups. The artificial intelligence model is trained based on the usage information received from the washing related machine and the obtained tendency information.

15 Claims, 14 Drawing Sheets

(51) Int. Cl.
  *G06F 18/23213* (2023.01)
  *G06N 20/00* (2019.01)
(58) Field of Classification Search
  CPC ............ D06F 2103/38; D06F 2105/00; D06F 2105/58; D06F 33/30; D06F 34/05; D06F 34/18; D06F 34/28; G06F 18/23213; G06F 18/214; G06F 18/24; G06N 20/00; G06K 9/6223
  See application file for complete search history.

(56) References Cited

U.S. PATENT DOCUMENTS

| | | | | |
|---|---|---|---|---|
| 2010/0174419 | A1* | 7/2010 | Brumfield | G01R 22/10 700/295 |
| 2015/0234829 | A1* | 8/2015 | Yoshitake | G06F 16/35 707/723 |
| 2018/0066389 | A1 | 3/2018 | Wu et al. | |
| 2018/0191518 | A1* | 7/2018 | Shu | H04L 12/2818 |
| 2018/0305821 | A1* | 10/2018 | Wan | C23D 5/005 |
| 2018/0305851 | A1* | 10/2018 | Kwon | H04L 12/2825 |
| 2019/0079476 | A1 | 3/2019 | Funes | |
| 2020/0004278 | A1 | 1/2020 | Lee | |
| 2020/0190721 | A1* | 6/2020 | Kim | D06F 33/00 |
| 2020/0199800 | A1* | 6/2020 | Han | D06F 33/00 |
| 2020/0208320 | A1* | 7/2020 | Kim | D06F 33/32 |
| 2020/0311834 | A1* | 10/2020 | Ting | G06F 16/587 |
| 2021/0087732 | A1* | 3/2021 | Park | D06F 33/00 |
| 2021/0192206 | A1 | 6/2021 | Kim | |
| 2021/0324561 | A1* | 10/2021 | Kim | G06N 3/08 |
| 2021/0333763 | A1* | 10/2021 | Kim | D06F 58/34 |

FOREIGN PATENT DOCUMENTS

| | | |
|---|---|---|
| JP | 6713131 B2 | 6/2020 |
| KR | 10-2009-0082686 A | 7/2009 |
| KR | 10-2015-0118749 A | 10/2015 |
| KR | 10-2018-0119486 A | 11/2018 |
| KR | 10-2019-0058172 A | 5/2019 |
| KR | 10-2019-0087348 A | 7/2019 |
| KR | 10-2019-0094297 A | 8/2019 |
| KR | 10-2019-0096879 A | 8/2019 |
| WO | WO-2022260890 A1 * | 12/2022 |

OTHER PUBLICATIONS

Wu, Daoyi. "Research on the micro-interactive interface design of intelligent washing machines in IOT environment." 2016 22nd International Conference on Automation and Computing (ICAC). IEEE, 2016. (Year: 2016).*

Nitta, Tsuneharu. "Applications of neural networks to home appliances." Proceedings of 1993 International Conference on Neural Networks (IJCNN-93—Nagoya, Japan). vol. 1. IEEE, 1993. (Year: 1993).*

Masood, Rao Farhat. "Application of fuzzy logic in design of smart washing machine." arXiv preprint arXiv:1701.01654 (2017). (Year: 2017).*

Benassi, Joe. "User Notification Interface Using Internet of Things Devices." (2018). (Year: 2018).*

\* cited by examiner

FIG. 4

| CLUSTER ID | MACHINE ID | PATTERN |
|---|---|---|
| 1 | 6daa16ea-01c6-cc71-5b0c-ec9d53368780 | #HIGH FREQUENT WASHING, #AFTERNOON WASHING, #BABY |
| | 3691b07c-63f1-1f84-fdfe-4b82c10338f8 | #TIME REDUCTION, #AFTERNOON WASHING |
| 2 | 1aab17ab-021c-cc72-5b0c-ce7c42259042 | #LOW FREQUENT WASHING, #MIDNIGHT WASHING, #BABY |
| | 5131b07b-41g2-2ffe-4c91-5c71d98727b1 | #MIDNIGHT WASHING, #BABY |

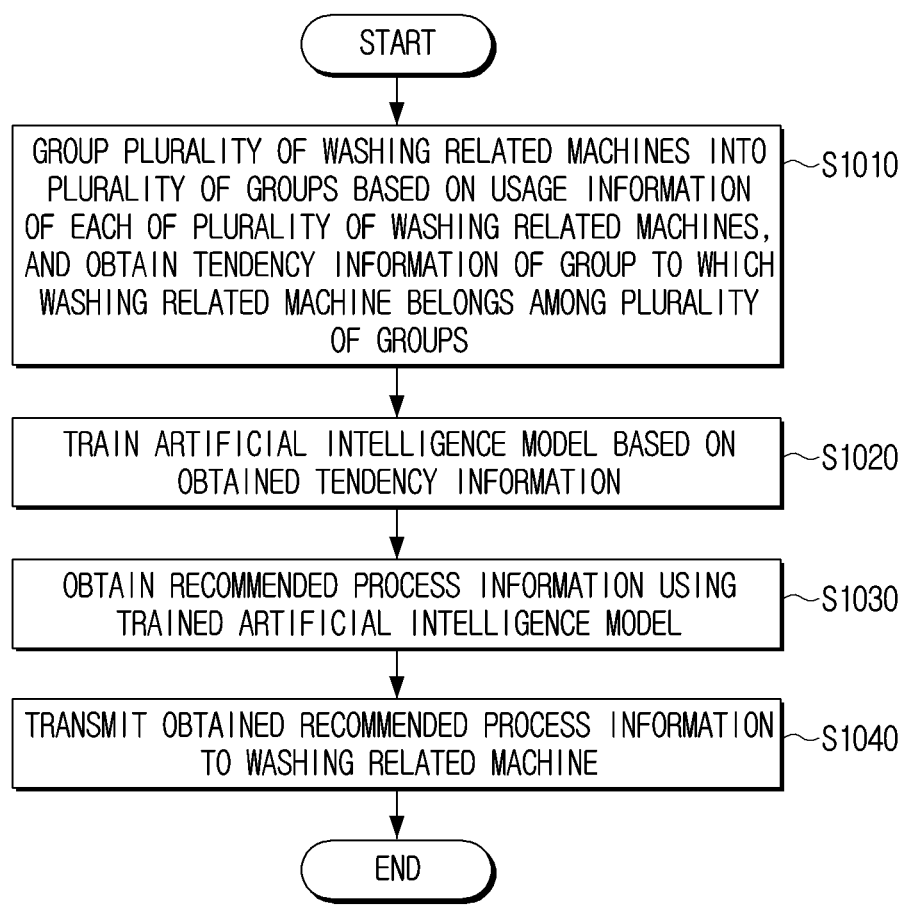

ELECTRONIC DEVICE AND CONTROLLING METHOD THEREOF

TECHNICAL FIELD

The disclosure relates to an electronic device and a controlling method thereof, and more particularly an electronic device managing usage information of a home appliance and a controlling method thereof.

BACKGROUND ART

Along with development of electronic technologies, various types of electronic devices have been developed and distributed. Particularly, home appliances used at home are developed continuously in recent years, in order to satisfy needs of users.

Recently, various methods for controlling the home appliances at home through an application installed on a smartphone are distributed.

According to an example, a function of providing recommended process information based on usage pattern information for a machine providing a washing related function such as a washing machine, a dryer, or an air dresser has been provided. However, if there is no much accumulated usage information of the washing related machine, there is a problem that the usage pattern information may not be generated.

DISCLOSURE

Technical Problem

The disclosure is made in view of the above needs and an object of the disclosure is to provide an electronic device providing recommended process information based on usage pattern information even for a washing related machine with no accumulated usage information, and a method for controlling the same.

Technical Solution

According to an aspect of the disclosure to achieve the aforementioned object, there is provided an electronic device including a memory storing information on a trained artificial intelligence model, a communication interface, and a processor configured to obtain recommended process information by using the artificial intelligence model and control the communication interface to transmit the obtained recommended process information to a washing related machine, in which the processor is configured to, based on usage information of each of a plurality of washing related machines, group the plurality of washing related machines into a plurality of groups and obtain tendency information of a group to which the washing related machine belongs among the plurality of groups, and the artificial intelligence model is trained based on the usage information received from the washing related machine and the obtained tendency information.

The artificial intelligence model may include a plurality of artificial intelligence models divided based on tendency information corresponding to each of the plurality of groups, and each of the plurality of artificial intelligence models may be trained based on the usage information received from the washing related machine and usage information corresponding to the group to which the washing related machine belongs.

The artificial intelligence model may be implemented as one artificial intelligence model capable of learning different pieces of tendency information, and trained based on the usage information received from the washing related machine, the usage information of each of the plurality of washing related machines, and tendency information corresponding to each of the plurality of groups.

The processor may be configured to obtain the recommended process information by inputting weather information, time information, machine information, and usage information to the artificial intelligence model, or obtain the recommended process information by inputting weather information, time information, machine information, usage information, and tendency information to the artificial intelligence model.

The artificial intelligence model may be trained based on the usage information received from the washing related machine, usage information corresponding to the group to which the washing related machine belongs, weather information, time information, and machine information, or trained based on the usage information received from the washing related machine, the usage information corresponding to the group to which the washing related machine belongs, the weather information, the time information, the machine information, and tendency information.

The processor may be configured to, based on feedback information related to user selection for the recommended process information being received from the washing related machine, re-identify a group to which the washing related machine belongs among the plurality of groups based on the received feedback information or re-train the artificial intelligence model based on the received feedback information.

The recommended process information may include at least one of a washing course information or washing option information.

The processor may be configured to, based on a plurality of pieces of recommended process information being obtained from the artificial intelligence model, control the communication interface to transmit the plurality of pieces of recommended process information and information on order of priority corresponding to the plurality of pieces of recommended process information to the washing related machine.

The processor may be configured to obtain usage patterns of the plurality of washing related machines based on usage information in a recent threshold time section of each of the plurality of washing related machines, and group the plurality of washing related machines into at least one group based on similarity between the usage patterns.

The processor may be configured to obtain the usage patterns of the plurality of washing related machines based on the usage information in the recent threshold time section of each of the plurality of washing related machines, and group the plurality of washing related machines into at least one group by using a K-means algorithm.

The usage information of the washing related machine may include data of at least one of a selected course, a total number of times of washing, a number of times of washing in each time section, a number of times of increasing or decreasing the rinsing, a number of times of increasing or decreasing a water temperature, a number of times of increasing or decreasing dehydration, a number of times of baby clothes washing, or a number of times of boil washing.

According to another aspect of the disclosure, there is provided a system including a server device configured to obtain recommended process information by using a trained artificial intelligence model and transmit the obtained recommended process information to a washing related machine, and a washing related machine configured to, based on the recommended process information being received from the server device, provide the received recommended process information. The server device may be configured to, based on usage information of each of a plurality of washing related machines, group the plurality of washing related machines into a plurality of groups and obtain tendency information of a group to which the washing related machine belongs among the plurality of groups. The artificial intelligence model may be trained based on the usage information received from the washing related machine and the obtained tendency information.

The washing related machine may be configured to, based on a plurality of pieces of recommended process information and information on order of priority corresponding to the plurality of pieces of recommended process information being received from the server device, provide the plurality of pieces of recommended process information based on the information on the order of priority.

According to still another aspect of the disclosure, there is provided a method for controlling an electronic device, the method including, based on usage information of each of a plurality of washing related machines, grouping the plurality of washing related machines into a plurality of groups and obtaining tendency information of a group to which the washing related machine belongs among the plurality of groups, obtaining recommended process information by using a trained artificial intelligence model, and transmitting the obtained recommended process information to the washing related machine, in which the artificial intelligence model is trained based on the usage information received from the washing related machine and the obtained tendency information.

The artificial intelligence model may include a plurality of artificial intelligence models divided based on tendency information corresponding to each of the plurality of groups, and each of the plurality of artificial intelligence models may be trained based on the usage information received from the washing related machine and usage information corresponding to the group to which the washing related machine belongs.

The artificial intelligence model may be implemented as one artificial intelligence model capable of learning different pieces of tendency information, and trained based on the usage information received from the washing related machine, the usage information of each of the plurality of washing related machines, and tendency information corresponding to each of the plurality of groups.

The obtaining the recommended process information may include obtaining the recommended process information by inputting weather information, time information, machine information, and usage information to the artificial intelligence model, or obtaining the recommended process information by inputting weather information, time information, machine information, usage information, and tendency information to the artificial intelligence model.

The artificial intelligence model may be trained based on the usage information received from the washing related machine, usage information corresponding to the group to which the washing related machine belongs, weather information, time information, and machine information, or trained based on the usage information received from the washing related machine, the usage information corresponding to the group to which the washing related machine belongs, the weather information, the time information, the machine information, and tendency information.

The control method may further include, based on a plurality of pieces of recommended process information being obtained from the artificial intelligence model, transmitting the plurality of pieces of recommended process information and information on order of priority corresponding to the plurality of pieces of recommended process information to the washing related machine.

The obtaining the tendency information of the group to which the washing related machine belong among the plurality of groups may include obtaining usage patterns of the plurality of washing related machines based on usage information in a recent threshold time section of each of the plurality of washing related machines, and grouping the plurality of washing related machines into at least one group based on similarity between the usage patterns.

Effect of Invention

According to the various embodiments described above, although there is not a large amount of usage information of the washing related machine, the recommended process information related to the usage pattern of the user may be provided, and accordingly, the convenience of the user is improved.

DESCRIPTION OF DRAWINGS

FIG. 4 is a diagram illustrating an example of mapping information according to an embodiment;

FIG. 10 is a flowchart illustrating a method for controlling the electronic device according to an embodiment.

BEST MODE

Detailed Description of Exemplary Embodiments

Hereinafter, the disclosure will be described in detail with reference to the accompanying drawings.

The disclosure will be described in greater detail below after briefly explaining the terms used in the disclosure.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

It should be understood that the expression such as "at least one of A or/and B" expresses any one of "A", "B", or "at least one of A and B".

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element).

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module" or a "unit" in the disclosure may perform at least one function or operation, and may be implemented as hardware, software, or a combination of hardware and software. Further, except for when each of a plurality of "modules", "units", and the like needs to be realized in an individual hardware, the components may be integrated in at least one module and be implemented in at least one processor (not illustrated).

Hereinafter, an embodiment of the disclosure will be described in greater detail with reference to the accompanying drawings.

Figure 1A:
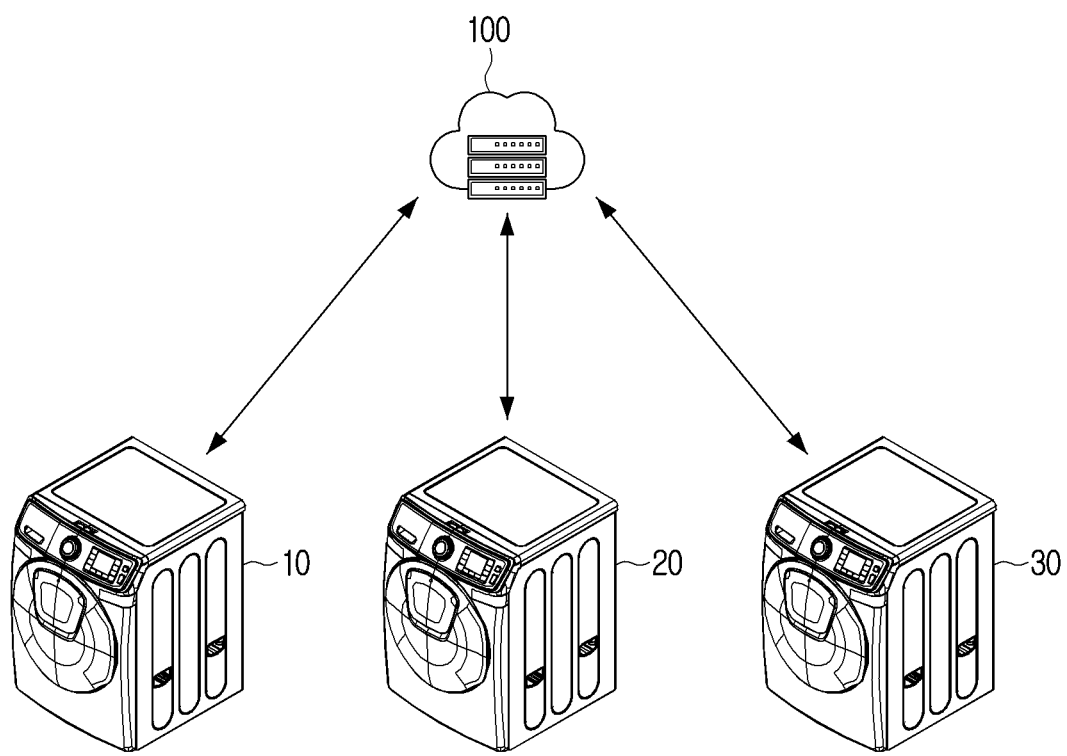
FIGS. 1A and 1B are diagrams illustrating a configuration of a system according to an embodiment.
Figure 1B:
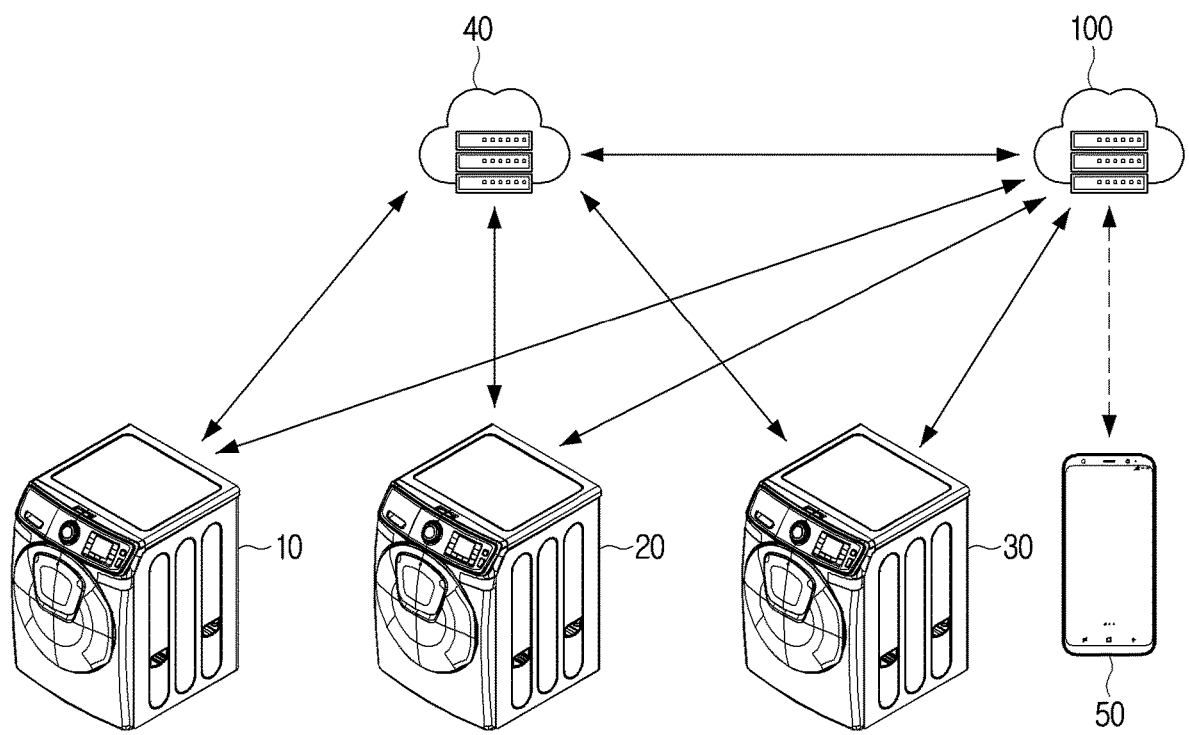

FIGS. 1A and 1B are diagrams illustrating a configuration of a system according to an embodiment.

Referring to FIG. 1A, a system includes an electronic device 100 and a plurality of control target machines 10, 20, and 30.

The electronic device 100 may control and manage various registered machines (e.g., home appliances Internet of Things (IoT) machines, and the like). For example, the electronic device 100 may register and manage the machine for each user account. According to an embodiment, the electronic device 100 may be implemented as, particularly, a cloud server but is not limited thereto.

The control target machines 10, 20, and 30 may be Internet of Things (IoT) machines capable of being controlled by signals received from the electronic device 100. According to an embodiment, the control target machines may be implemented as machines performing various functions related to washing such as a washing machine washing laundry with water and a detergent and dehydrating the wet laundry, a dryer performing a drying function with respect to clothes, and a clothes refresher performing a purification function with respect to clothes and the like. Hereinafter, for convenience of description, a machine performing various functions related to the laundry will be referred to as a "washing related machine". In addition, for convenience of description, the description will be made by assuming that the plurality of washing related machines 10, 20, and 30 are washing related machines registered on user accounts different from each other.

The electronic device 100 may communicate with the washing related machines 10, 20, and 30 via an access point or communicate with the washing related machines 10, 20, and 30 through a communication network such as LTE or 5G. Particularly, the electronic device 100 may provide recommended process information for a specific washing related machine 10 using an artificial intelligence model based on usage information received from the plurality of washing related machines 10, 20, and 30. The specific washing related machine 10 may be a washing related machine in which an event of requesting for the recommended process information occurs.

Referring to FIG. 1B, the system may include the electronic device 100, a data server 40, a user terminal 50, and the plurality of control target devices 10, 20, and 30.

According to an embodiment illustrated in FIG. 1B, the electronic device 100 may also receive the usage information of the plurality of washing related machines 10, 20, and 30 through the data server 40, without receiving the usage information directly from the plurality of washing related machines 10, 20, and 30. In this case, the data server 40 may be implemented as a database server storing and managing the usage information of the plurality of washing related machines 10, 20, and 30. For example, the data server 40 may be implemented as a server providing a breakdown repairing service of the plurality of washing related machines 10, 20, and 30 based on the usage information of the plurality of washing related machines 10, 20, and 30.

According to another embodiment illustrated in FIG. 1B, the electronic device 100 may communicate with the user terminal 50.

The user terminal 50 may download and install an application from a server (not illustrated) providing the application. According to an embodiment, the user terminal 50 may be implemented as a user terminal such as a smartphone or a tablet. However, there is no limitation thereto, and the user terminal 50 may be implemented as a notebook, a smart TV, a mobile phone, a personal digital assistant (PDA), a laptop, a media player, an electronic book reader, a digital broadcasting terminal, a navigation system, an MP3 player, a digital camera, a home appliance, other mobile or non-mobile computing device, or may be a wearable terminal such as a watch, glasses, a hair band, and a ring. Herein, the washing related machine 10 may be an Internet of Things (IoT) device capable of being controlled through the application installed on the user terminal 50. According to an embodiment, the washing related machine may be implemented as a washing machine, a dryer, a clothes refresher, and the like.

The user may execute the application on the user terminal 50, input a user account, and log on the electronic device 100, for example, a server through the input user account, and the user terminal 50 may communicate with the electronic device 100 based on the user account that the user logged on. The electronic device 100 may register the washing related machine 10 on a corresponding user account. For example, the user terminal 50 may communicate with the washing related machine 10 operating in an access point (AP) mode and transmit information on the access point (e.g., Wi-Fi access point) to the washing related machine 10. For example, the user terminal 50 may display a list of connectable access points on a display of the user terminal 50 and transmit information on an access point selected according to a user command on the list to the washing related machine 10. In this case, the washing related machine 10 may be connected to the access point by using the information on the access point received from the user terminal 50 and access the electronic device 100 through the access point. Accordingly, if the electronic device 100 accesses the washing related machine 10 through the access point, the washing related machine 10 may be registered on the user account that the user logged on. In some cases, the electronic device 100 may provide recommended process information for the specific washing related machine 10 to the user terminal 50.

Hereinafter, various embodiments in that the electronic device 100 provides the recommended process information based on the usage information of the washing related machine 10 will be described according to various embodiments of the disclosure.

Figure 2:
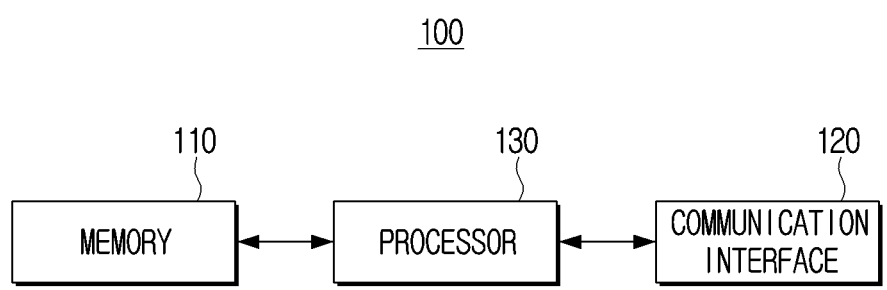
FIG. 2 is a block diagram illustrating a configuration of an electronic device 100 according to an embodiment.

FIG. 2 is a block diagram illustrating a configuration of the electronic device 100 according to an embodiment.

Referring to FIG. 2, the electronic device 100 may include a memory 110, a communication interface 120, and a processor 130.

The electronic device 100 may be implemented as a server and may be implemented as, for example, a server with a constructed cloud computing environment. There is no limitation thereto, as long as it is a device processing data using an artificial intelligence model.

The memory 110 may store data necessary for various embodiments of the disclosure. The memory 110 may be implemented in a form of a memory embedded in the electronic device 100 or implemented in a form of a memory communicable with (or detachable from) the electronic device 100 according to data storage purpose. For example, data for operating the electronic device 100 may be stored in a memory embedded in the electronic device 100, and data for an extended function of the electronic device 100 may be stored in a memory communicable with the electronic device 100. The memory embedded in the electronic device 100 may be implemented as at least one of a volatile memory (e.g., dynamic RAM (DRAM), static RAM (SRAM), or synchronous dynamic RAM (SDRAM)), a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), hard drive, or solid state drive, and the like. The memory communicable with the electronic device 100 may be implemented in a form of a memory card (e.g., a compact flash (CF), a secure digital (SD), micro secure digital (Micro-SD), mini secure digital (Mini-SD), extreme digital (xD), multi-media card (MMC), an external memory connectable to a USB port (e.g., USB memory), and the like.

According to an example, the memory 110 may store at least one instruction for controlling the electronic device 100 or a computer program including instructions.

According to another example, the memory 110 may store information on an artificial intelligence model including a plurality of layers. The storing the information on the artificial intelligence model may refer to storing various pieces of information related to the operation of the artificial intelligence model, for example, information on a plurality of layers included in the artificial intelligence model, information on a parameter (e.g., filter coefficient, bias, or the like) used in each of the plurality of layers, and the like. For example, the memory 120 may store the information on the artificial intelligence model trained to obtain the recommended process information according to an embodiment. However, if the processor 130 is implemented as dedicated hardware for the artificial intelligence model, the information on the artificial intelligence model may be stored in an external memory of the processor 130.

According to an embodiment, the memory 110 may be implemented as a single memory storing data generated in various operations according to the disclosure. However, according to another embodiment, the memory 110 may be implemented to store each of pieces of data in various types or include a plurality of memories storing each of the pieces of data generated in different steps.

The communication interface 120 may communicate with the plurality of washing related machines 10, 20, and 30.

According to an embodiment, the communication interface 120 may include a wireless communication module communicating with the washing related machine 10, 20, and 30. According to another embodiment, the communication interface 120 may additionally communicate with at least one of the data server 40 or the user terminal 50.

For example, the communication interface 120 may include a wireless communication module, for example, a Wi-Fi module. However, there is no limitation thereto, and the communication interface 120 may perform communication based on various wireless communication standards such as Zigbee, 3rd Generation (3G), 3rd Generation Partnership Project (3GPP), Long Term Evolution (LTE), LTE Advanced (LTE-A), 4th generation (4G), and 5th generation (5G), and technology of infrared data association (IrDA), in addition to the communication method described above.

The processor 130 may be electrically connected to the memory 110 to control general operations of the electronic device 100. The processor 130 may be configured with one or a plurality of processors. Specifically, the processor 130 may perform the operations of the electronic device 100 according to the various embodiments of the disclosure, by executing at least one instruction stored in the memory 110.

According to an embodiment, the processor 130 may be implemented as a digital signal processor (DSP), a microprocessor, a graphics processing unit (GPU), an artificial intelligence (AI) processor, a neural processing unit (NPU), or a time controller (TCON) for processing digital image signals. However, there is no limitation thereto, and the processor may include one or more of a central processing unit (CPU), a microcontroller unit (MCU), a microprocessing unit (MPU), a controller, an application processor (AP), or a communication processor (CP), and an ARM processor or may be defined as the corresponding term. In addition, the processor 130 may be implemented as System on Chip (SoC) or large scale integration (LSI) including the processing algorithm or may be implemented in form of an application specific integrated circuit (ASIC) or a field programmable gate array (FPGA).

In addition, the processor 130 for executing the artificial intelligence model according to an embodiment may be implemented through a combination of a general processor such as a CPU, an AP, a digital signal processor (DSP), a graphic dedicated processor such as a GPU, a vision processing unit (VPU) or an artificial intelligence dedicated processor such as a NPU and software. The processor 130 may perform control to process input data according to a predefined operation rule or an artificial intelligence model stored in the memory 110. In addition, if the processor 130 is a dedicated processor (or artificial intelligence dedicated processor), the processor may be designed with a hardware structure specialized in processing a specific artificial intelligence model. For example, the hardware specialized in processing the specific artificial intelligence model may be designed as a hardware chip such as ASIC, FPGA, and the like. If the processor 130 is implemented as a dedicated processor, the processor may be implemented to include a memory for implementing the embodiment of the disclosure or implemented to have a memory processing function for using an external memory.

According to an embodiment, the processor 130 may obtain the recommended process information by using the artificial intelligence model and control the communication interface 120 to transmit the obtained recommended process information to the washing related machine 10 or the user terminal 50.

According to an example, the artificial intelligence model may be implemented as a convolutional neural network (CNN), a recurrent neural network (RNN), a Restricted Boltzmann Machine (RBM), deep belief network (DBN), a bidirectional recurrent deep neural network (BRDNN) or Deep Q-Networks, but is not limited thereto.

The recommended process information may include course information and option information (e.g., option information for each course). For example, the washing course may include a standard course, a wool course, a baby clothes course, a soft bubbles course, and the like and the option information may include a washing time, a water temperature, a drying time, and the like. In a case of the dryer, the course information may include blanket/dusting, a sterilization course, a strong course, and the like and the option course may include a drying level, a drying time, and the like. In a case of the clothes refresher, the course information may include a standard course, a fine dust course, a high speed course, a sterilization course, and the like and the option course may include a management level, a management time, and the like. However, these are examples of the course information and the option information and various information may be added. In addition, not only the course information and the option information, but also various additional information may be added to the recommended process information.

In this case, the processor 130 may group the plurality of washing related machines into a plurality of groups based on the usage information of each of the plurality of washing related machines, and obtain tendency information of a group to which the washing related machine 10 belongs among the plurality of groups. According to an embodiment, the plurality of grouped washing related machines may be the same type of machines, for example, the washing machines.

In this case, the artificial intelligence model may be trained based on the usage information received from the washing related machine 10 and the obtained tendency information (or course tendency information). In other words, according to an embodiment, although the amount of the usage information of the washing related machine 10 is insufficient to train the artificial intelligence model, the artificial intelligence model may be trained by using usage information with the same tendency as the usage information of the washing related machine 10. Accordingly, although the usage information of the washing related machine 10 is not sufficiently accumulated, the recommended process information suitable for the usage tendency of the washing related machine 10 of the user may be provided through the artificial intelligence model.

If the washing related machine is implemented as the washing machine, the usage information may include various pieces of usage data such as a selected course, a total number of times of washing, a number of times of washing in each time section (e.g., [number of washing from 00:00. to 06:00], [number of washing from 06:00 to 12:00], [number of washing from 12:00 to 18:00], and [number of washing from 18:00 to 24:00]), a number of times of increasing or decreasing the rinsing, a number of times of increasing or decreasing a water temperature, a number of times of increasing or decreasing dehydration, a number of times of baby clothes washing, or a number of times of boil washing. If the washing related machine is implemented as the dryer or the clothes refresher, various pieces of usage data related to the functions of the corresponding machine may be included. For example, in a case of the dryer, the usage information may include course information (blanket/dusting, a sterilization course, a strong course, and the like), a drying level, a drying time, and the like. In a case of the clothes refresher, the usage information may include the course information (a standard course, a fine dust course, a high speed course, a sterilization course, and the like), a management level, a management time, and the like.

According to an example, the processor 130 may group the plurality of washing related machines based on the usage information of a recent threshold time section (hereinafter, referred to as recent usage information) of each of the plurality of washing related machines. Specifically, the processor 130 may obtain a usage pattern based on the usage information in the recent threshold time section of each of the plurality of washing related machines, and group the plurality of washing related machines into at least one group based on similarity of the usage patterns. The recent threshold time section herein may be usage information obtained before a predetermined time section from the current time, for example, usage information obtained for recent two weeks.

For example, the processor 130 may obtain the usage pattern by generating the different types of usage information in a form of vector data. The usage pattern herein may refer to a temporary pattern based on the recent usage information.

In an example, the processor 130 may generate the vector data in a form of {first type usage information, second type usage information, third type usage information, . . ., n-th type usage information}. The different types of usage information may include, for example, a total number of times of washing, a number of times of washing in each time section (e.g., [number of washing from 00:00. to 06:00], [number of washing from 06:00 to 12:00], [number of washing from 12:00 to 18:00], and [number of washing from 18:00 to 24:00]), a number of times of increasing or decreasing the rinsing, a number of times of increasing or decreasing a water temperature, a number of times of increasing or decreasing dehydration, a number of times of baby clothes washing, or a number of times of boil washing. For example, if the vector data is in a form of {total number of times of washing, number of times of increasing or decreasing the rinsing, number of times of increasing or decreasing a water temperature, number of times of increasing or decreasing dehydration}, vector data in a form of {10, 3, 2, −1} may be generated.

When the usage pattern (e.g., vector data) of each of the plurality of washing related machines is obtained, the processor 130 may group the plurality of washing related machines into at least one group by applying an artificial intelligence technology (or artificial intelligence modeling) to the obtained usage pattern.

According to an example, the processor 130 may group the plurality of washing related machines into at least one group by using K-means algorithm based on the obtained usage pattern. The K-means algorithm may refer to an unsupervised learning algorithm for collecting and clustering pieces of similar data. The unsupervised learning herein may be applied to a case where there is only input without output, and the unsupervised learning may be an algorithm with no regularity between inputs. According to an example, 1. pieces of data closer to a centroid value are clustered, 2. the centroid value is changed to a centroid value of the clustered data, and 3. the processes 1 and 2 are repeated until the centroid value does not change anymore.

Figure 3A:
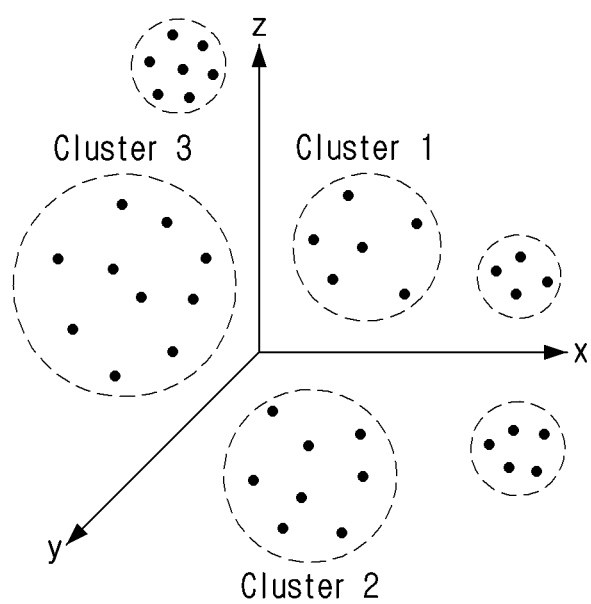
FIGS. 3A and 3B are diagrams illustrating a method for grouping washing related machines according to an embodiment.
Figure 3B:
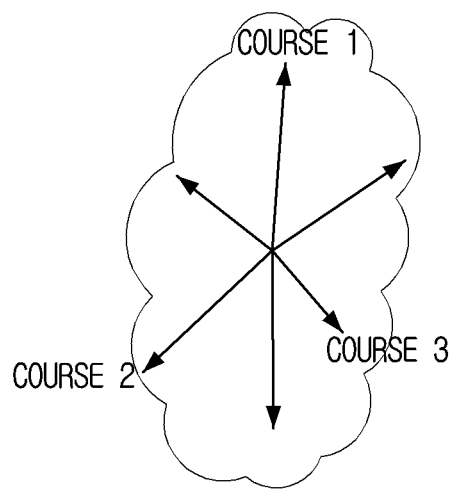

The processor 130 may group the plurality of washing related machines into a plurality of groups (Cluster 1, Cluster 2, Cluster 3) by using the K-means algorithm described above, referring to FIG. 3A, for example. Here, x, y, and z axes may include different types of usage information, for example, a selected course, a total number of times of washing, a number of times of washing in each time section, a number of times of increasing or decreasing the rinsing, a number of times of increasing or decreasing a water temperature, a number of times of increasing or decreasing dehydration, a number of times of baby clothes washing, or a number of times of boil washing. FIG. 3A illustrates only three axes of x, y, and z axes, but the number of axes, that is, the number of dimensions may be various according to the type of the usage information. According to an example, referring to FIG. 3B, the plurality of groups (Cluster 1, Cluster 2, and Cluster 3) may correspond to different courses, respectively, but are not limited thereto. For example, some of the plurality of groups (Cluster 1, Cluster 2, and Cluster 3) may correspond to different options of the same course, respectively.

In this case, the processor 130 may obtain the usage information in the recent threshold time section of each of the plurality of washing related machines in a threshold time unit, and obtain recent usage patterns of the plurality of washing related machines based on the obtained usage information. For example, the processor 130 may obtain usage information of each of the plurality of washing related machines in a section of recent two weeks per day, and obtain recent usage pattern of the plurality of washing related machines based on the obtained usage information. In other words, the processor may obtain the recent usage pattern based on the usage information in a section of recent two weeks from today, and, on the next day, obtain recent usage pattern based on the usage information in a section of recent two weeks from the next day, thereby updating the recent usage pattern daily. The expressions of "per day" and the "section of two weeks" are examples of values for convenience of description and there is no limitation thereto.

According to an embodiment, when the plurality of washing related machines are grouped into the plurality of groups, the processor 130 may obtain tendency information of each group. In addition, the processor 130 may map the usage information for each group to group identification information, device identification information, and the like and store the pieces of information in a form of a lookup table to use the pieces of information for training the artificial intelligence model. FIG. 4 is a diagram illustrating an example of mapping information according to an embodiment.

According to an example, the tendency information may be various information for reflecting representative tendency of each group. For example, the tendency information may be representative usage pattern of each of the plurality of groups. According to an example, if the usage pattern information corresponding to each of the plurality of washing related machines belonging to a specific group is generated, the usage pattern information with high priority among the corresponding washing related machines may be set as the representative usage pattern information or the plurality of pieces of usage pattern information may be averaged to set the representative usage pattern information.

The order of priority may be set in consideration of at least one of size information of the usage data used for generating the usage pattern information, date information of the usage data used for generating the usage pattern information, position information of the washing related machines, or manufacturer or model information of the washing related machines. For example, as the size information of the usage data is large, high priority may be applied to the usage pattern information, or as the date information of the usage data indicates a recent date, high priority may be applied to the usage pattern information. However, the above examples are merely examples of setting the order of priority, and the order of priority may be set by various other methods.

According to an embodiment, the artificial intelligence model may be trained based on the usage information received from the washing related machine 10, usage information corresponding to the group to which the washing related machine 10 belongs, weather information, time information, and machine information. Alternatively, the artificial intelligence model may be trained based on the usage information received from the washing related machine 10, usage information of another washing related machine, weather information, time information, machine information, and tendency information. However, the weather information, the time information, and the machine information are not necessarily required for the training, and at least some thereof may be omitted or other information may be added, as necessary.

The machine information may include various pieces of information related to the washing related machine 10, for example, various pieces of information such as a function, a model, a type, a manufacturer, or a position, the time information may include various pieces of information related to the time such as time, day, holiday, and the like, and the weather information may include various pieces of information related to weather such as a temperature, dust, an ozone level, precipitation, wind, or humidity.

According to an embodiment, the artificial intelligence model may include a plurality of artificial intelligence models divided based on tendency information corresponding to each of the plurality of groups. In this case, each of the plurality of artificial intelligence models may be trained based on the usage information received from the washing related machine 10 and the usage information corresponding to the group to which the washing related machine 10 belongs. The usage information corresponding to the group to which the washing related machine 10 belongs may be usage information of another washing related machine included in the group to which the washing related machine 10 belongs.

According to another embodiment, the artificial intelligence model may be trained based on the usage information received from the washing related machine 10, usage information of each of the plurality of washing related machines, and tendency information corresponding to each of the plurality of groups.

Figure 5A:
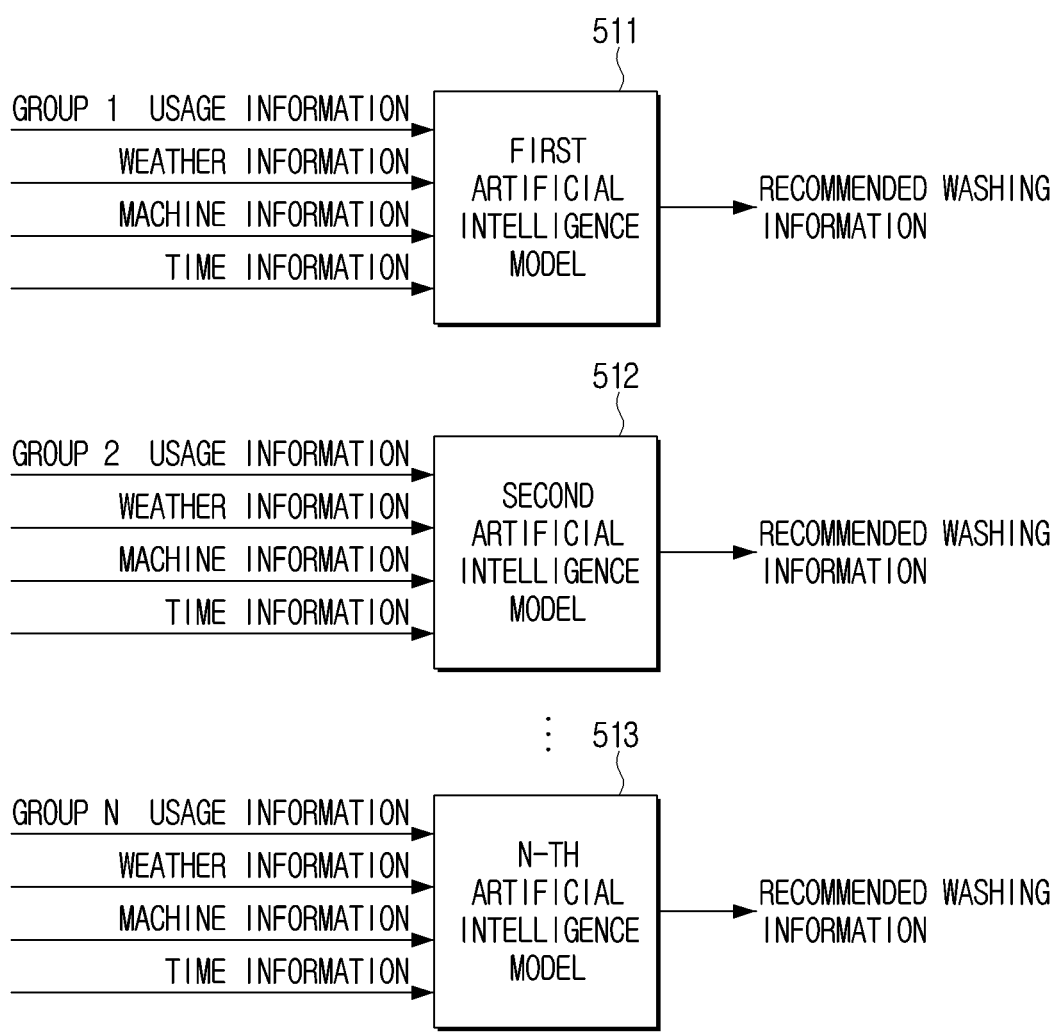
FIGS. 5A and 5B are diagrams illustrating a method for training artificial intelligence models according to various embodiments.
Figure 5B:
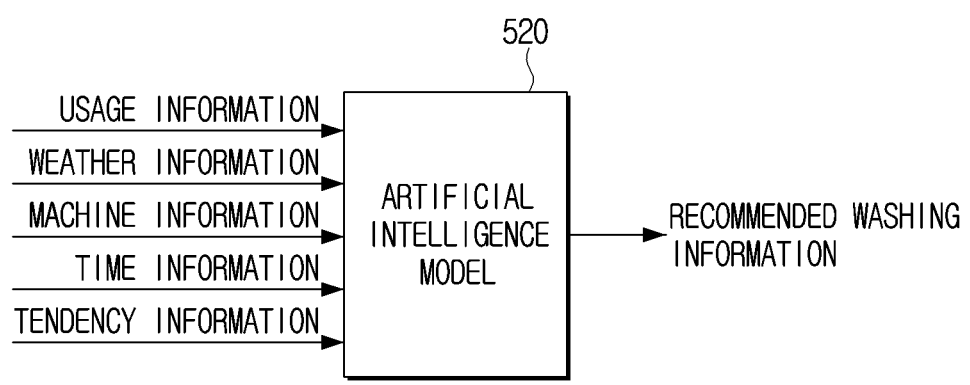

FIGS. 5A and 5B are diagrams illustrating a method for training artificial intelligence models according to various embodiments.

According to an embodiment, the artificial intelligence model may be trained based on a pair of input training data and output training data or may be trained based on input training data. The training the artificial intelligence model herein may imply that a predefined action rule or an artificial intelligence model set to perform a desired feature (or object) is formed by training a basic artificial intelligence model (e.g., artificial intelligence model including arbitrary random parameter) using a plurality of pieces of training data by a learning algorithm. Such training may be performed through the electronic device 100 or may be performed through a separate server and/or system. Examples of the learning algorithm include supervised learning, unsupervised learning, semi-supervised learning, or reinforcement learning, but there is no limitation to the above examples. The above training is an example of the supervised learning, and the artificial intelligence model may be trained based on the unsupervised learning for training the artificial intelligence model by only inputting the input data without using the recommended process information as the output data.

According to an embodiment illustrated in FIG. 5A, the artificial intelligence model for each group, that is, for each group tendency may be separately provided. In an example, the group tendency may be a course tendency, but is not limited thereto. For example, the group tendency may be option tendencies different from each other in the same course.

For example, referring to FIG. 5A, a first artificial intelligence model 511 corresponding to a first group may be trained using the usage information and the recommended process information of the first group as a pair of input and output training data. For example, referring to FIG. 5A, the first artificial intelligence model 511 may be trained using input data of the usage information of the first group, the weather information, the machine information, and the time information and output data of the recommended process information as a pair of the input and output training data. In this case, the usage information may be usage information of the washing related machines belonging to the first group. In addition, a second artificial intelligence model 512 corresponding to a second group may be trained using the usage information of the second group and the recommended process information as a pair of the input and output training data. However, this is merely an example of the supervised learning, and the artificial intelligence model may be trained based on the unsupervised learning for training the artificial intelligence model by inputting only the input data without using the recommended process information as the output data.

According to another embodiment illustrated in FIG. 5B, only one artificial intelligence model capable of learning different pieces of tendency information may be provided.

Unlike as illustrated in FIG. 5A, an artificial intelligence model 520 may be trained using input data of the usage information, the weather information, the machine information, the time information, and the tendency information and output data of the recommended process information as a pair of the input and output training data. The usage information may be arbitrary usage information not related to the group. However, the artificial intelligence model 520 may be trained to output the recommended process information corresponding to each group using the tendency information as the training data.

Returning to FIG. 2, the processor 130 may transmit the recommended process information obtained from the trained artificial intelligence model to the washing related machine 10 or the user terminal 50. In this case, the input data of the artificial intelligence model may include at least one of the weather information, the time information, the machine information, and the usage information. According to an implementation example of the artificial intelligence model, the tendency information may be additionally input to the artificial intelligence model.

The trained artificial intelligence model may output at least one piece of recommended process information and a probability value corresponding to the corresponding information. For example, if a plurality of pieces of recommended process information are output from the artificial intelligence model, the processor 130 may determine the order of priority of each recommended process information based on the corresponding probability value. In this case, the processor 130 may transmit the plurality of pieces of recommended process information and the corresponding order of priority information to the washing related machine 10 or the user terminal 50. However, the order of priority is not necessarily determined by the probability values and may also be determined according to a predetermined rule.

In this case, the output part of the artificial intelligence model may be implemented so as to be able to perform softmax process. Here, softmax is a function that normalizes an input value to a value between 0 to 1 and obtains a total of output values as 1, and may have a function of outputting a probability value for each class, that is, each recommended process information. In some cases, the output part of the artificial intelligence model may be implemented so as to be able to perform Argmax process. Here, Argmax is a function that selects a value with the highest possibility among a plurality of labels, and may have a function of selecting a percentage with a highest value among probability values for each class. That is, if the output part of each of the artificial intelligence model is subjected to Argmax process, only one piece of recommended process information having the highest probability value may be output.

According to an embodiment, the processor 130 may transmit the recommended process information to the washing related machine 10 or the user terminal 50 and then receive feedback information related to user selection for the recommended process information from the washing related machine 10 or the user terminal 50. In this case, the processor 130 may re-identify a group to which the washing related machine 10 belongs among the plurality of groups based on the received feedback information. For example, if the user selects recommended process information with a low priority among the plurality of pieces of recommended process information or proceeds with the process by changing some option information of the recommended process information, the processor 130 may re-identify the group to which the washing related machine 10 belongs by reflecting the corresponding feedback information. In addition, the processor 130 may re-identify the artificial intelligence model by reflecting the corresponding feedback information.

Figure 6:
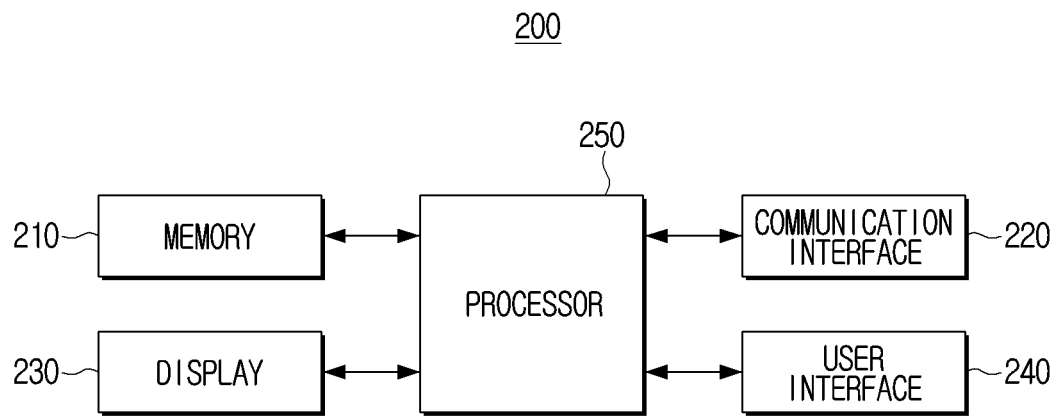
FIG. 6 is a diagram illustrating an implementation example of another electronic device according to another embodiment.

FIG. 6 is a diagram illustrating an implementation example of another electronic device according to another embodiment.

Referring to FIG. 6, an electronic device 200 may include a memory 210, a communication interface 220, a display 230, a user interface 240, and a processor 250. Here, the electronic device 200 may be implemented as the washing related machine 10 or the user terminal 50 illustrated in FIGS. 1A and 1B.

The memory 210 may store various modules for driving the electronic device 200. For example, the memory 210 may store software including a base module, a sensing module, a communication module, a presentation module, a web browser module, and a service module.

According to an embodiment, if the electronic device 200 is implemented as the washing related machine 10, the memory 210 may store various pieces of usage information obtained from the washing related machine 10.

According to another embodiment, if the electronic device 200 is implemented as the user terminal 50, the memory 210 may store an application for controlling an external device (e.g., application described with reference to FIG. 1B). The application herein may be an application for remotely controlling home appliances and the like at home.

The communication interface 220 may communicate with an external device (e.g., the electronic device 100 of FIGS. 1A and 1B).

According to an embodiment, the communication interface 220 may include, for example, a Wi-Fi module. The Wi-Fi module may perform communication according to at least one standard version of 802.11a, 802.11b, 802.11g, 802.11n, and 802.11ac, but is not limited thereto and may include a new version which will be developed in the future. There is no limitation thereto, and the communication interface 220 may perform communication based on various wireless communication standards such as Zigbee, 3rd Generation (3G), 3rd Generation Partnership Project (3GPP), Long Term Evolution (LTE), LTE Advanced (LTE-A), 4th generation (4G), and 5th generation (5G), and technology of infrared data association (IrDA), in addition to the communication method described above.

The display 230 may be implemented as a display including a self-emission element or a display including a non-self-emission element and a backlight. For example, the display 230 may be implemented as various types of displays such as a liquid crystal display (LCD), organic light emitting diodes (OLED) display, light emitting diodes (LED), micro LED, mini LED, plasma display panel (PDP), quantum dot (QD) display, and quantum dot light-emitting diodes (QLED). The display 230 may include a driving circuit or a backlight unit which may be implemented in a form of a-si TFT, a low temperature poly silicon (LTPS) TFT, or an organic TFT (OTFT). Meanwhile, the display 230 may be implemented as a touch screen combined with a touch sensor, a flexible display, a rollable display, a 3D display, a display physically connected to a plurality of display modules, and the like.

The user interface 240 may be implemented as a device such as a button, a touch pad, a mouse, and a keyboard, and may also be implemented as a touch screen capable of performing a display function and a manipulation input function. The button may be various types of buttons such as a mechanical button, a touch pad, or a wheel formed in any region of a front portion, a side portion, or a rear portion of appearance of a main body of the electronic device 200.

The processor 250 may control general operations of the electronic device 200.

Particularly, the processor 250 may control the display 230 to display a UI screen. The UI screen may include various content reproduction screen such as an image, a video, a text, music, and the like, an application execution screen containing various contents, a web browser screen, a graphic user interface (GUI) screen, and the like.

According to an embodiment, the processor 250 may control the display 230 to provide a UI for controlling the electronic device 200 or a UI screen related to an external device. In this case, the corresponding UI screen may be provided through an application which is software directly used by a user on the OS. In this case, the application may be provided in a form of an icon interface on a screen of the display 230. According to an example, if the electronic device 200 is implemented as the user terminal 50, the processor 250 may control the display 230 to provide a UI screen related to an external device. In this case, the external device may be the washing related machine 10.

According to an example, the UI screen provided through the application may provide various pieces of information related to the process of the washing related machine 10 and may have a function of a control panel capable of performing input and output to control the washing related machine. In other words, the UI screen is a configuration for an interface with the user, and may include an input interface for receiving the user input and an output interface displaying information (e.g., control information) according to the user input.

According to an example, the processor 250 may transmit a request for the recommended process information of the washing related machine 10 to a server (e.g., the electronic device 100 of FIGS. 1A and 1B) according to a predetermined event, and provide the recommended process information received from the server. If the electronic device 200 is implemented as the washing related machine 10, the predetermined event may be an event in which the power of the washing related machine 10 is turned on, and if the electronic device 200 is implemented as the user terminal 50, the predetermined event may be an event in which a specific application is driven and a function related to a washing related machine is selected. In this case, the processor 250 may provide the recommended process information through a screen of an application being executed.

If the electronic device 200 is implemented as the washing related machine 10, the recommended process information may be provided through a user interface (UI) screen provided on the washing related machine. In this case, if a plurality of pieces of recommended process information are received, the processor 250 may control the display 230 to provide the plurality of pieces of recommended process information based on information on the order of priority corresponding to the plurality of pieces of recommended process information.

In addition, the electronic device 200 may further include various input and output interfaces (not illustrated), a speaker (not illustrated), and a microphone (not illustrated). The microphone is a constituent element for receiving a user's voice or other sounds and converting the sound into audio data. For example, the information included in the UI screen according to various embodiments of the disclosure may be provided as a voice through the speaker (not illustrated) and a user command may be input as a voice through the microphone (not illustrated).

Figure 7:
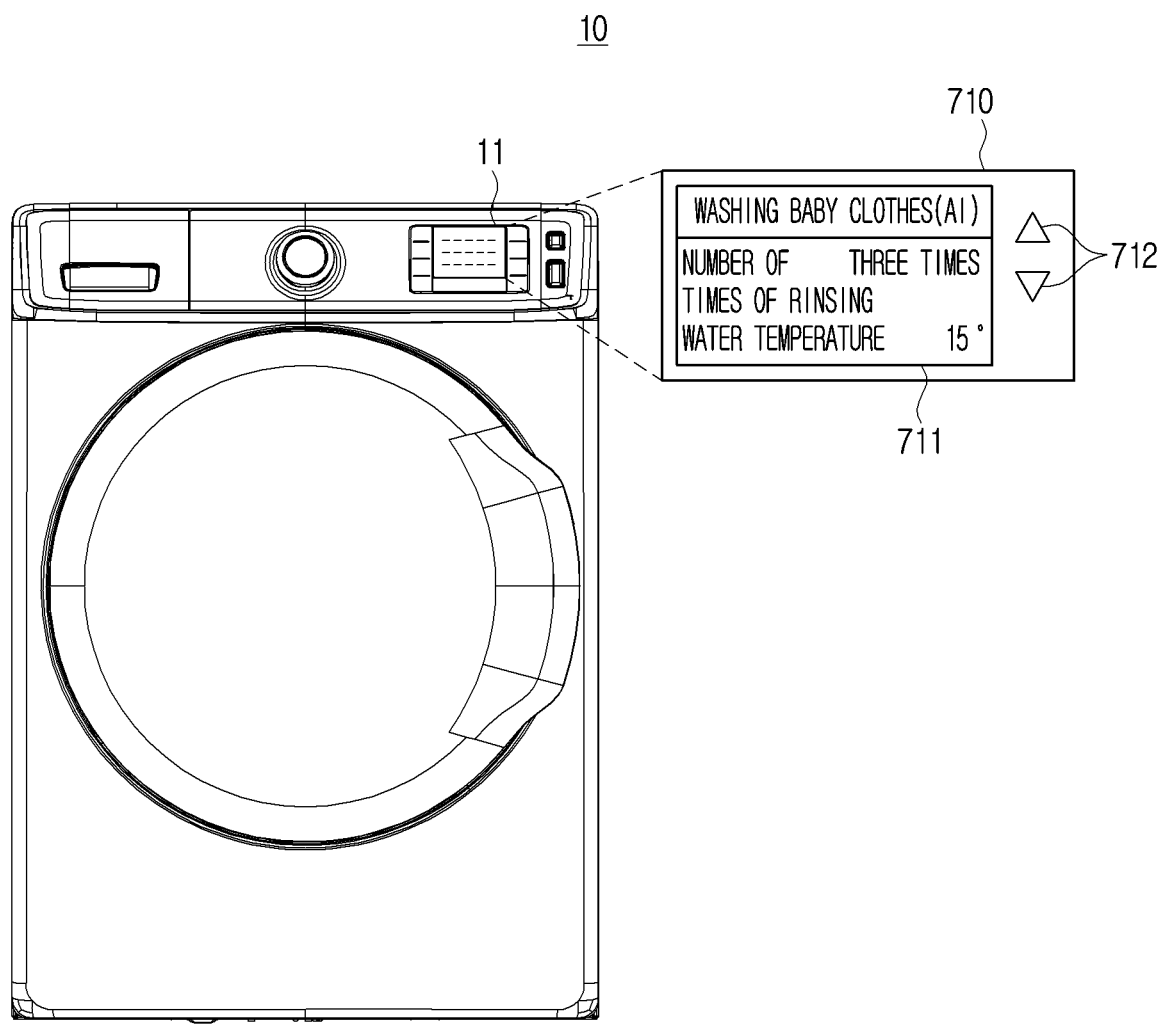
FIGS. 7, 8A, and 8B are diagrams illustrating provided UI screens according to an embodiment.
Figure 8A:
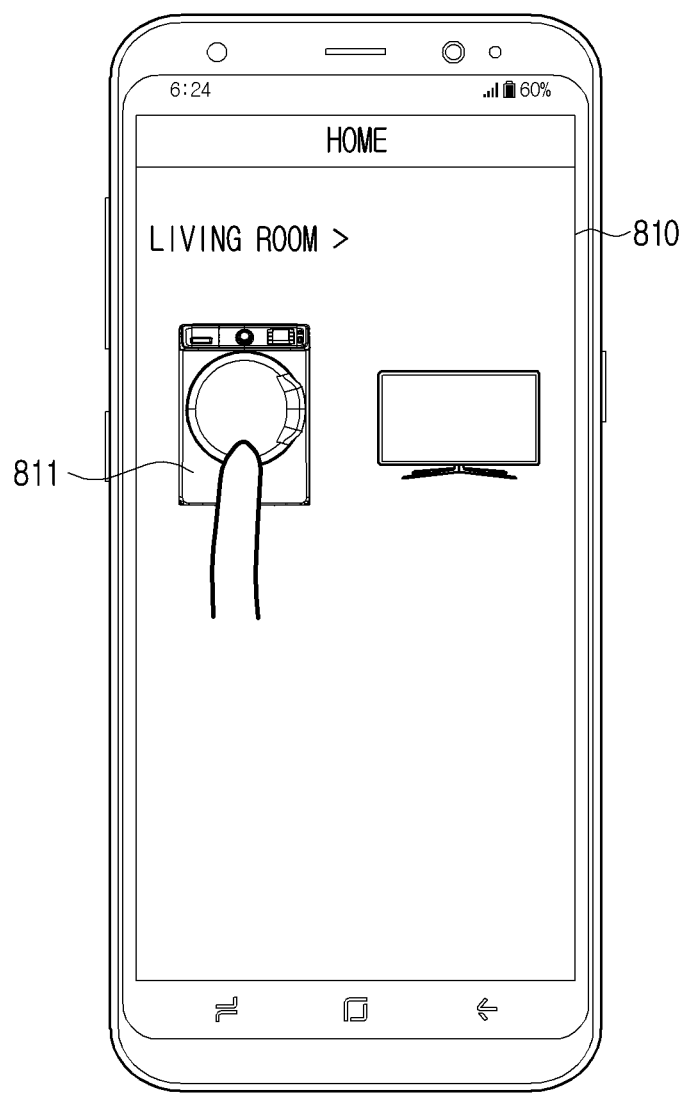
Figure 8B:
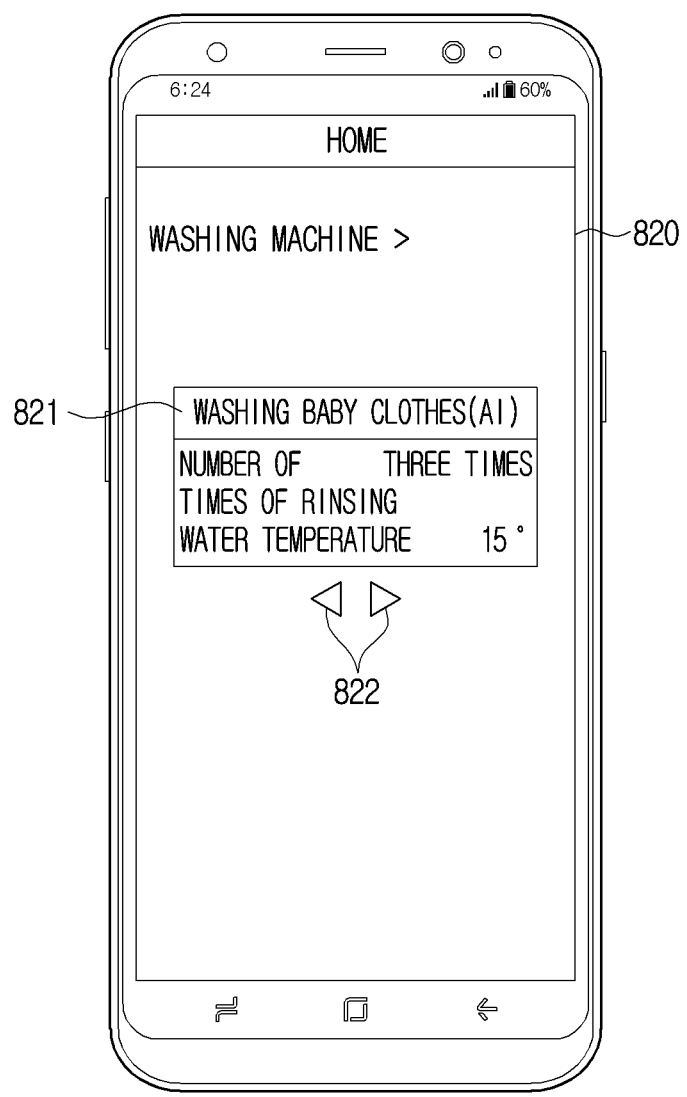

FIGS. 7, 8A, and 8B are diagrams illustrating provided UI screens according to an embodiment.

FIG. 7 shows a UI screen in a case where the electronic device 200 is implemented as the washing related machine 10.

Referring to FIG. 7, a UI screen 710 providing recommended process information 711 according to a predetermined event may be provided on a display 11. In addition, a navigation GUI 712 for checking recommended process information that is recommended secondly may be also provided. According to an example, the provided recommended process information may be sequentially provided according to the order of priority. In this case, the predetermined event may be, for example, an event in which the washing related machine 10 is turned on to turn the display 11 on, but may also be an event in which a user's command for requesting for recommended information is received, and the like.

FIGS. 8A and 8B illustrate UI screens in a case where the electronic device 200 is implemented as the user terminal 50.

FIG. 8A illustrates a UI screen provided when a specific application is executed, and icon images representing controllable home appliances may be provided on a corresponding UI screen 810. When a washing related machine 811 is selected by a touch input of the user, referring to FIG. 8B, a UI screen 820 providing recommended process information 821 may be provided. In addition, a navigation GUI 822 for checking recommended process information that is recommended secondly may be also provided.

Figure 9:
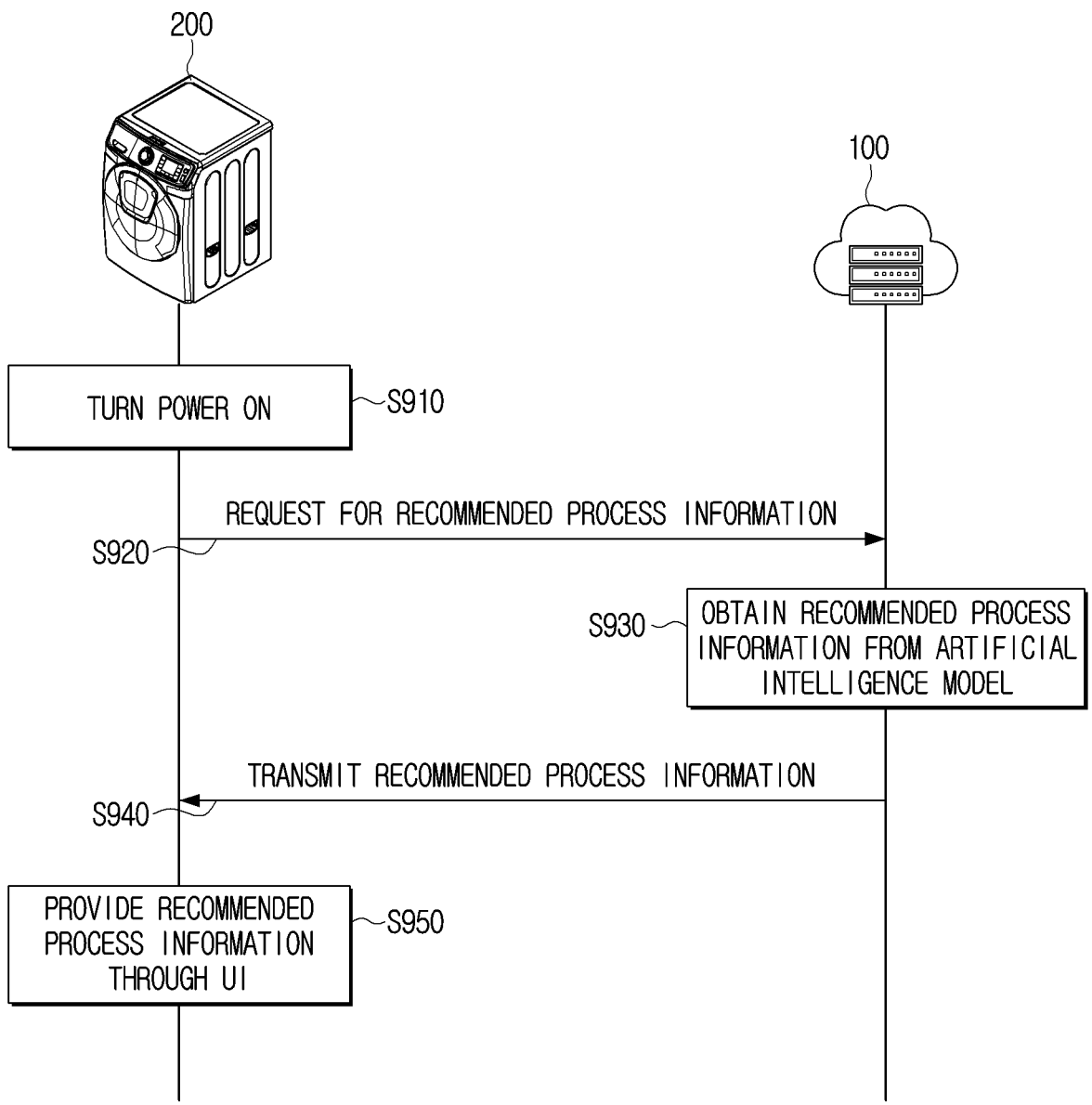
FIG. 9 is a sequence diagram illustrating an operation of an electronic system according to an embodiment.

FIG. 9 is a sequence diagram illustrating an operation of an electronic system according to an embodiment.

According to the sequence diagram illustrated in FIG. 9, when the power of the washing related machine 10 is turned on (S910), the washing related machine 10 may request the electronic device 100 for the recommended process information (S920). According to an example, the Wi-Fi module provided in the washing related machine 10 may transmit an application program interface (API) request signal for requesting for the recommended process information to the electronic device 100.

If the signal for requesting for the recommended process information is received from the washing related machine 10, the electronic device 100 may obtain the recommended process information using the trained artificial intelligence model (S930). According to an example, the electronic device 100 may obtain the recommended process information from the artificial intelligence model trained based on the usage information and the tendency information received from the electronic device 100. In addition, the electronic device 100 may obtain the recommended process information from the artificial intelligence model trained additionally using at least one of the weather information, the time information, or the machine information.

When the recommended process information is obtained (S930), the electronic device 100 may transmit the obtained recommended process information to the washing related machine 10 (S940). According to an example, the electronic device 100 may transmit an API response signal including the recommended process information to the electronic device 100.

In this case, the washing related machine 10 may provide the received recommended process information through the UI. In this case, when the plurality of pieces of recommended process information and the information on the order of priority are received, the washing related machine 10 may sequentially provide the plurality of pieces of recommended process information according to the user command based on the order of priority of the plurality of pieces of recommended process information.

In some cases, if the washing related machine 10 is not connected to the electronic device 100 through a network, the washing related machine 10 may not receive the recommended process information. In this case, the washing related machine 10 may be automatically set according to an on-device course setting function. For example, the washing related machine 10 may be set in the order of most frequently used courses and options from a recent usage history.

Also, if the washing related machine 10 receives the recommended process information which is not supported by the machine specification, for example, if the recommended process information includes option information not supported by the washing related machine 10, the washing related machine 10 may be automatically set according to the on-device course setting function.

FIG. 10 is a flowchart illustrating a method for controlling the electronic device according to an embodiment.

According to the method for controlling the electronic device illustrated in FIG. 10, a plurality of washing related machines may be grouped into a plurality of groups based on usage information of each of the plurality of washing related machines, and tendency information of a group to which the washing related machine belongs among the plurality of groups may be obtained (S1010).

An artificial intelligence model may be trained based on the obtained tendency information (S1020).

The recommended process information may be obtained using the trained artificial intelligence model (S1030).

Then, the obtained recommended process information may be transmitted to the washing related machine (S1040).

The artificial intelligence model may include a plurality of artificial intelligence models divided based on the tendency information corresponding to each of the plurality of groups. In this case, each of the plurality of artificial intelligence models may be trained based on usage information received from the washing related machine and usage information corresponding to a group to which the washing related machine belongs.

Specifically, the artificial intelligence model may be trained based on the usage information received from a specific washing related machine, and the usage information corresponding to the group to which the specific washing related machine belongs, the weather information, the time information, and the machine information.

In addition, the artificial intelligence model may be implemented as one artificial intelligence model. In this case, the artificial intelligence model may be trained based on the usage information received from the specific washing related machine, the usage information of each of the plurality of washing related machines, and the tendency information corresponding to each of the plurality of groups.

Specifically, the artificial intelligence model may be trained based on the usage information received from the specific washing related machine, and the usage information corresponding to the group to which the specific washing related machine belongs, the weather information, and the time information, the machine information, and the tendency information.

In addition, in the step S1030 of obtaining the recommended process information, the recommended process information may be obtained by inputting the weather information, the time information, the machine information, and the usage information to the artificial intelligence model, or the recommended process information may be obtained by inputting the weather information, the time information, the machine information, the usage information, and the tendency information to the artificial intelligence model.

Meanwhile, the control method may further include, based on the plurality of pieces of recommended process information being obtained from the artificial intelligence model, transmitting the plurality of pieces of recommended process information and the information on the order of priority corresponding to the plurality of pieces of recommended process information to the washing related machine.

In addition, in the step S1010 of obtaining the tendency information of the group to which the washing related machine belongs among the plurality of groups, a usage pattern of the plurality of washing related machines may be obtained based on the usage information in a recent threshold time section of each of the plurality of washing related machines, and the plurality of washing related machines may be grouped into at least one group based on similarity of the usage pattern.

In addition, in the step S1010 of obtaining the tendency information of the group to which the washing related machine belongs among the plurality of groups, the usage pattern of the plurality of washing related machines may be obtained based on the usage information in the recent threshold time section of each of the plurality of washing related machines, and the plurality of washing related machines may be grouped into at least one group by using a K-means algorithm.

According to the various embodiments, although there is not a large amount of usage information of the washing related machine, the recommended process information related to the usage pattern of the user may be provided, and accordingly, the convenience of the user is improved.

Meanwhile, the methods according to the various embodiments of the disclosure described above may be implemented in a form of an application installable in the electronic device of the related art.

In addition, the methods according to the embodiments of the disclosure described above may be implemented simply by the software upgrade or hardware upgrade in the electronic device of the related art.

Further, the embodiments of the disclosure described above may be performed through an embedded server provided in the electronic device or an external server of the electronic device.

Meanwhile, according to an embodiment of the disclosure, various embodiments of the disclosure may be implemented as software including instructions stored in machine (e.g., computer)-readable storage media. The machine is a device which invokes instructions stored in the storage medium and is operated according to the invoked instructions, and may include an electronic device (e.g., electronic device A) according to the disclosed embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals (e.g., electromagnetic wave), and this term does not distinguish that data is semi-permanently or temporarily stored in the storage medium. For example, the "non-transitory storage medium" may include a buffer temporarily storing data.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online (e.g., downloading or uploading) through an application store (e.g., PlayStore™) or directly between two user devices (e.g., smartphones). In a case of the on-line distribution, at least a part of the computer program product may be at least temporarily stored or temporarily generated in a machine-readable storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
a memory storing information on a trained artificial intelligence model;
a communication interface;
a display; and
a processor configured to:
when a signal requesting recommended process information is received from a washing related machine by the communication interface, obtain the recommended process information by using the artificial intelligence model,
control the communication interface to transmit the obtained recommended process information to a washing related machine,
receive usage information of each of a plurality of washing related machines by the communication interface,
based on each of the received usage information of each of a plurality of washing related machines, group the plurality of washing related machines into a plurality of groups,
obtain tendency information of a group to which the washing related machine belongs among the plurality of groups,
obtain recent usage information of each of the plurality of washing related machines based on a selected course on the plurality of washing related machines,
obtain a usage pattern of each of the plurality of washing related machines based on the usage information in a threshold time section of each of the plurality of washing related machines, by generating different types of the usage information in a form of vector data,
group the plurality of washing related machines based on the recent usage information and the usage pattern,
group the plurality of washing related machines into at least one group based on similarity between the usage patterns, and
control the display to display a user interface (UI) corresponding to the obtained recommended process information, wherein the artificial intelligence model is trained based on the recommended process information based on the usage information received from the washing related machine, the obtained tendency information, the recent usage information, and the usage pattern.

2. The electronic device according to claim 1, wherein the artificial intelligence model comprises a plurality of artificial intelligence models divided based on tendency information corresponding to each of the plurality of groups, and wherein each of the plurality of artificial intelligence models is trained based on the usage information received from the washing related machine and usage information corresponding to the group to which the washing related machine belongs.

3. The electronic device according to claim 1, wherein the artificial intelligence model is implemented as one artificial intelligence model capable of learning different pieces of tendency information, and trained based on the usage information received from the washing related machine, the usage information of each of the plurality of washing related machines, and tendency information corresponding to each of the plurality of groups.

4. The electronic device according to claim 1, wherein the processor is configured to:
obtain the recommended process information by inputting weather information, time information, machine information, and usage information to the artificial intelligence model, or
obtain the recommended process information by inputting weather information, time information, machine information, usage information, and tendency information to the artificial intelligence model.

5. The electronic device according to claim 1, wherein the artificial intelligence model is,
trained based on the usage information received from the washing related machine, usage information corresponding to the group to which the washing related machine belongs, weather information, time information, and machine information, or trained based on the usage information received from the washing related machine, the usage information corresponding to the group to which the washing related machine belongs, the weather information, the time information, the machine information, and tendency information.

6. The electronic device according to claim 1, wherein the processor is configured to, based on feedback information related to user selection for the recommended process information being received from the washing related machine, re-identify a group to which the washing related machine belongs among the plurality of groups based on the received feedback information or re-train the artificial intelligence model based on the received feedback information.

7. The electronic device according to claim 1, wherein the recommended process information comprises at least one of a washing course information or washing option information.

8. The electronic device according to claim 1, wherein the processor is configured to, based on a plurality of pieces of recommended process information being obtained from the artificial intelligence model, control the communication interface to transmit the plurality of pieces of recommended process information and information on order of priority corresponding to the plurality of pieces of recommended process information to the washing related machine.

9. The electronic device according to claim 1, wherein the processor is configured to obtain the usage patterns of the plurality of washing related machines based on the usage information in the recent threshold time section of each of the plurality of washing related machines, and group the plurality of washing related machines into at least one group by using a K-means algorithm.

10. The electronic device according to claim 1, wherein the usage information of the washing related machine comprises data of at least one of a total number of times of washing, a number of times of washing in each time section, a number of times of increasing or decreasing a rinsing, a number of times of increasing or decreasing a water temperature, a number of times of increasing or decreasing dehydration, a number of times of baby clothes washing, or a number of times of boil washing.

11. The electronic device according to claim 1, further comprising:
mapping the usage information for each of the plurality of groups into group identification information and device identification information.

12. A system comprising:
a server device configured to:
obtain recommended process information by using a trained artificial intelligence model, and
transmit the obtained recommended process information to a washing related machine; and
a washing related machine configured to:
based on the recommended process information being received from the server device, provide the received recommended process information, and
display a user interface (UI) corresponding to the obtained recommended process information,
wherein the server device is configured to, based on usage information of each of a plurality of washing related machines, group the plurality of washing related machines into a plurality of groups and obtain tendency information of a group to which the washing related machine belongs among the plurality of groups,
wherein the server device is configured to:
obtain a usage pattern of each of the plurality of washing related machines by generating different types of the usage information in a form of vector data, and based on recent usage information and a usage pattern of each of the plurality of washing related machines, group the plurality of washing related machines based on a similarity of the usage patterns,
wherein the artificial intelligence model is trained based on the usage information received from the washing related machine, the obtained tendency information, the recent usage information, and the usage pattern,
wherein the recent usage information is based on a selected course on the plurality of washing related machines, and
wherein the usage pattern is based on a selected course on the washing related machines.

13. The system according to claim 12, wherein the washing related machine is configured to, based on a plurality of pieces of recommended process information and information on order of priority corresponding to the plurality of pieces of recommended process information being received from the server device, provide the plurality of pieces of recommended process information based on the information on the order of priority.

14. A method for controlling an electronic device, the method comprising:
- receiving usage information of each of a plurality of washing related machines;
- based on each of the received usage information of each of a plurality of washing related machines, grouping the plurality of washing related machines into a plurality of groups and obtaining tendency information of a group to which the washing related machine belongs among the plurality of groups;
- receiving a signal requesting recommended process information from the washing related machine;
- obtaining recommended process information by using a trained artificial intelligence model; and
- transmitting the obtained recommended process information to the washing related machine,
- wherein the obtaining tendency information of a group to which a washing related machine belongs among the plurality of groups comprises:
- obtaining recent usage information based on a selected course on the plurality of washing related machines,
- obtaining a usage pattern of each of the plurality of washing related machines based on the usage information in a threshold time section of each of the plurality of washing related machines, by generating different types of the usage information in a form of vector data,
- based on the received recent usage information, the usage pattern of each of a plurality of washing related machines, and similarity between the usage patterns, grouping the plurality of washing related machines, and
- displaying a user interface (UI) corresponding to the obtained recommended process information, and
- wherein the artificial intelligence model is trained to obtain the recommended process information based on the usage information received from the washing related machine, the obtained tendency information, the recent usage information, and the usage pattern.

15. The method according to claim 14, wherein the artificial intelligence model comprises a plurality of artificial intelligence models divided based on tendency information corresponding to each of the plurality of groups, and wherein each of the plurality of artificial intelligence models is trained based on the usage information received from the washing related machine and usage information corresponding to a group to which the washing related machine belongs.

* * * * *